United States Patent
Yoon

(10) Patent No.: US 9,937,917 B2
(45) Date of Patent: Apr. 10, 2018

(54) DRIVING CONTROL METHOD FOR HYBRID VEHICLES

(71) Applicant: HYUNDAI MOTOR COMPANY, Seoul (KR)

(72) Inventor: Young Min Yoon, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 170 days.

(21) Appl. No.: 15/054,856

(22) Filed: Feb. 26, 2016

(65) Prior Publication Data
US 2017/0101085 A1  Apr. 13, 2017

(30) Foreign Application Priority Data
Oct. 8, 2015 (KR) .......................... 10-2015-0141303

(51) Int. Cl.
*B60W 20/30* (2016.01)
*B60W 10/02* (2006.01)
(Continued)

(52) U.S. Cl.
CPC ............ *B60W 20/30* (2013.01); *B60W 10/02* (2013.01); *B60W 10/06* (2013.01); *B60W 10/08* (2013.01);
(Continued)

(58) Field of Classification Search
CPC ............ F16H 3/006; F16H 2200/0056; F16H 2061/0411; F16H 2061/1264; F16H 2200/0047; F16H 2200/0052; F16H 2200/0082; F16H 2306/48; F16H 3/725; F16H 61/0021; F16H 61/0403; F16H 61/12; F16H 61/688; F16H 2003/0822;
(Continued)

(56) References Cited

U.S. PATENT DOCUMENTS

| 2010/0279818 A1* | 11/2010 | Soliman | B60W 10/02 477/5 |
| 2015/0080175 A1* | 3/2015 | Kobayashi | B60K 6/48 477/5 |
| 2016/0202719 A1* | 7/2016 | Lippman | G05G 1/44 74/513 |

FOREIGN PATENT DOCUMENTS

| JP | 2001-105907 | 4/2001 | |
| JP | 2001105907 A * | 4/2001 | ............. B60K 6/365 |

(Continued)

OTHER PUBLICATIONS

JP2001105907—machine translation.pdf, Hoshiya et al. pub Apr. 17, 2001 (Year: 2001).*

*Primary Examiner* — Jelani A Smith
(74) *Attorney, Agent, or Firm* — Brinks Gilson & Lione

(57) ABSTRACT

A driving control method for a hybrid vehicle is provided to overcome a slip of the vehicle by a conversion of an EV mode into an HEV mode. The driving control method includes: determining by a controller whether the hybrid vehicle is insufficiently driven backward only by power of a motor when the vehicle is driven backward on an uphill road by driving the motor backward; starting an engine and engaging a backward stage gear; releasing a first clutch and at the same time requesting a brake operation signal to the hybrid vehicle while the motor is converted into forward driving; and then engaging a second clutch and requesting a brake release signal to the hybrid vehicle while an engine clutch is engaged to control the hybrid vehicle to be started by the power of the motor and the engine.

4 Claims, 3 Drawing Sheets

(51) Int. Cl.
  *B60W 10/18*   (2012.01)
  *B60W 30/20*   (2006.01)
  *B60W 10/06*   (2006.01)
  *B60W 10/08*   (2006.01)
  *B60W 10/113*  (2012.01)
  *B60W 10/184*  (2012.01)
  *B60W 30/18*   (2012.01)
  *B60W 20/40*   (2016.01)

(52) U.S. Cl.
  CPC .......... *B60W 10/113* (2013.01); *B60W 10/18* (2013.01); *B60W 10/184* (2013.01); *B60W 20/40* (2013.01); *B60W 30/18036* (2013.01); *B60W 30/20* (2013.01); *B60W 2030/203* (2013.01); *B60W 2030/206* (2013.01); *B60W 2510/244* (2013.01); *B60W 2530/16* (2013.01); *B60W 2550/142* (2013.01); *B60W 2710/081* (2013.01); *B60W 2710/1005* (2013.01); *Y10S 903/902* (2013.01)

(58) Field of Classification Search
  CPC ..... F16H 2003/0931; F16H 2003/0938; F16H 2003/442; F16H 2061/0037; F16H 2061/1224; F16H 2061/1268; F16H 2061/6607; F16H 2200/006; F16H 2200/0065; F16H 2200/0078; F16H 2200/0086; F16H 2200/2005; F16H 2200/2012; F16H 2200/2015; F16H 2200/2017; F16H 2200/2046; F16H 2200/2051; F16H 2200/2056; F16H 2200/2058; F16H 2200/2064; F16H 2200/2094; F16H 2200/2097; F16H 2306/40; F16H 2312/02; F16H 2312/14; F16H 37/04; F16H 3/089

See application file for complete search history.

(56) References Cited

FOREIGN PATENT DOCUMENTS

| | | |
|---|---|---|
| JP | 2007-326478 A | 12/2007 |
| JP | 2011-213167 | 10/2011 |
| JP | 2013-91353 | 5/2013 |
| JP | 2015-128914 | 7/2015 |
| JP | 2015-137064 | 7/2015 |
| KR | 10-2006-0095238 | 8/2006 |
| KR | 10-2009-0122764 | 12/2009 |

\* cited by examiner

DRIVING CONTROL METHOD FOR HYBRID VEHICLES

CROSS REFERENCE TO RELATED APPLICATION

The present application claims priority to and the benefit of Korean Patent Application No. 10-2015-0141303, filed on Oct. 8, 2015, which is incorporated herein by reference in its entirety.

FIELD

The present disclosure relates to a driving control method for hybrid vehicles capable of overcoming a slip of the vehicles.

BACKGROUND

The statements in this section merely provide background information related to the present disclosure and may not constitute prior art.

A double clutch transmission (DCT) has a plurality of forward stages and one backward stage.

For the backward driving, an R stage gear is fastened and even clutches are controlled. In this case, a first stage gear already fastened is released to inhibit or prevent gear backlashing noise occurring at the time of R stage driving. Similarly, the R stage gear is released at the time of forward driving.

Therefore, the first stage gear and the R stage gear are repeatedly fastened and released frequently upon the conversion of R→D and D→R (lurch driving mode) at a low speed, and therefore driving responsiveness may be delayed and excessive noise may occur.

However, when the power of the motor is insufficient due to an effect of a gradient during the backward movement or an electric vehicle (EV) mode needs to be converted into an HEV mode due to a low SOC of a battery, a slip of the vehicles may occur while backward driving of the motor is converted into forward driving.

SUMMARY

The present disclosure provides a driving control method for hybrid vehicles capable of overcoming a slip of the vehicles in the case in which the vehicles need to be converted into an HEV mode upon backward movement in response to backward driving of a motor.

According to an exemplary embodiment of the present disclosure, there is provided a driving control method for hybrid vehicles, including: a determining step of determining whether the vehicles are sufficiently driven backward only by power of a motor when being backward driven on an uphill road by driving the motor backward in a state in which a forward stage gear is engaged; a step of preparing an HEV mode in which an engine is started and a backward stage gear is engaged when it is determined that the backward driving only by the power of the motor is insufficient; a braking step in which a first clutch provided with the forward stage gear is released and at the same time a brake operation signal is requested to the vehicles while the motor is converted into forward driving; and a driving step of driving an HEV mode in which a second clutch provided with the backward stage gear is engaged and a brake release signal is requested to the vehicles while an engine clutch is engaged to control the vehicles to be started by the power of the motor and the engine.

The brake may be operated and released by an electronic stability program (ESP) system.

In the driving of the HEV mode, a motor speed may be increased to be synchronized with the engine speed and then an engine clutch may be coupled and a second clutch may be controlled to make the second clutch speed follow up the engine speed so as to control the starting of the vehicles.

The forward stage gear and the backward stage gear may be engaged and released by an odd stage gear actuator and an even stage gear actuator, the first clutch and the second clutch may be engaged and released by first and second clutch actuators, a controller may control driving of the odd stage gear actuator and the even stage gear actuator, the first and second clutch actuators, the engine, and the motor, the controller may determine whether the vehicles are driven backward only by the power of the motor, and the controller may request a brake operation signal and a brake release signal to the vehicles.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
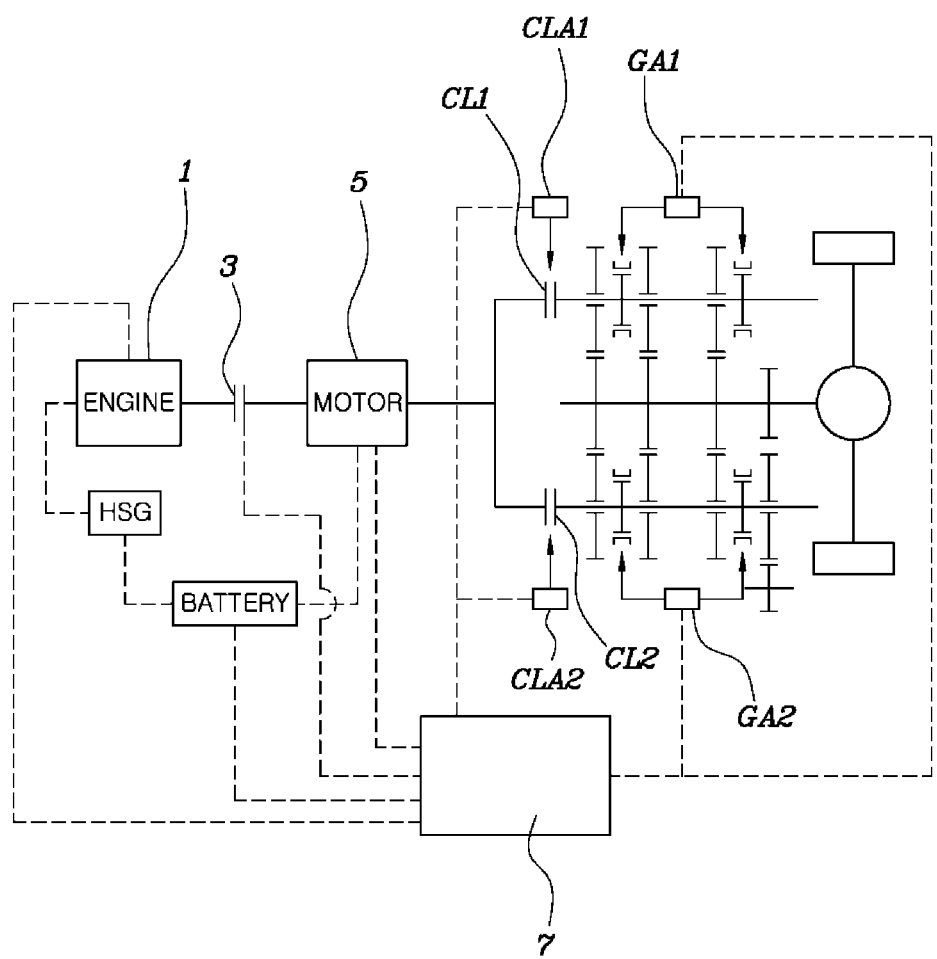
FIG. 1 is a diagram schematically illustrating an overall configuration of a hybrid vehicle to which an exemplary embodiment of the present disclosure may be applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A driving control method for hybrid vehicles according to an exemplary embodiment of the present disclosure may include determining step, an HEV mode preparing step, braking step, and the HEV driving mode step.

Figure 2:
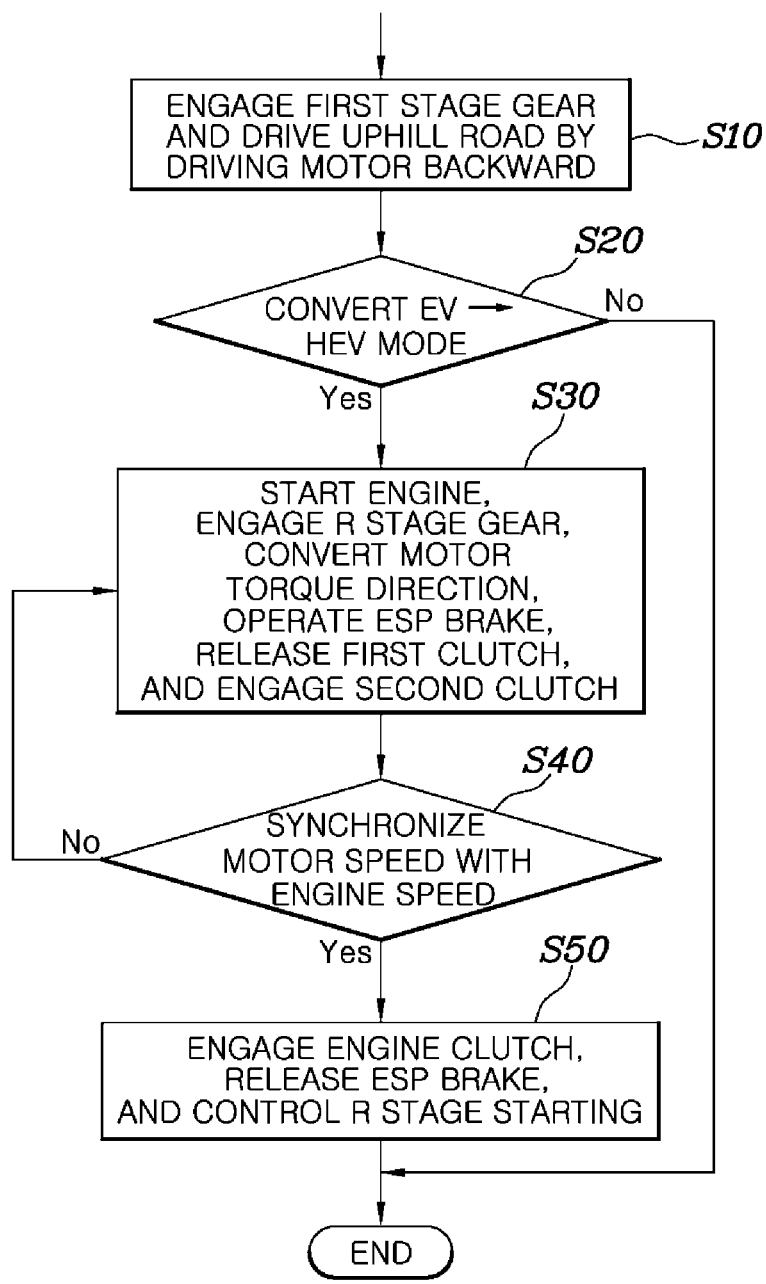
FIG. 2 is a diagram for describing a control flow of a driving control method for hybrid vehicles according to an exemplary embodiment of the present disclosure.

Referring to FIGS. 1 and 2, first, in the determining step, it may be determined whether a vehicle is sufficiently driven backward only by power of a motor 5 when the vehicle is driven backward by driving the motor 5 backward in a state in which a forward stage gear is engaged.

For example, the forward stage gear may be, in particular, a forward first stage gear among a plurality of forward stage gears.

Further, a controller 7 may determine whether the backward driving is sufficient in order to determine whether an EV mode in which the vehicle is driven only by the power of the motor 5 needs to be converted into an HEV mode in which the vehicle is driven using the power of an engine 1 and the motor 5 together. These cases are, for example, when the power of the motor 5 is insufficient during the backward movement due to a high slope of an uphill road or when the power of the engine 1 is required due to a low SOC of a battery.

In the HEV mode preparing step, the engine 1 may be started and a backward stage gear may be engaged, when it is determined that the backward driving only by the power of the motor 5 is insufficient.

That is, upon the determination that the EV mode needs to be converted into the HEV mode, the backward stage gear is engaged using an even stage gear actuator GA2 while the engine 1 is started using a hybrid starter generator (HSG).

In this case, the HSG and the even stage gear actuator GA2 may receive an operation signal from the controller 7 to drive the engine 1 and engage the backward stage gear. The GA1 illustrated in the drawings is an odd stage gear actuator which couples and releases odd stage gears along with the forward first stage gear.

In the braking step, a brake operation signal may be requested to the vehicle while a first clutch CL1 provided with the forward stage gear is released and at the same time the motor 5 is converted into forward driving.

For example, the first clutch CL1 for transmitting power to the forward first stage gear is released by a first clutch actuator CLA1 and at the same time the controller 7 applies a control signal to the motor 5 to convert the motor torque from the backward direction into the forward direction so that the motor 5 is controlled to be driven forward.

In this case, the operation of the first clutch actuator CLA1 for the coupling and releasing operations of the first clutch CL1 and the operation of a second clutch actuator CLA2 for the coupling and releasing operations of a second clutch CL2 may be controlled by the controller 7.

Further, the brake may be operated by an electronic stability program (ESP) system and the controller 7 may request the brake operation signal to the ESP.

In the HEV driving mode step, the second clutch CL2 provided with the backward stage gear is engaged and the brake release signal is requested to the vehicles while an engine clutch 3 is engaged to control the vehicles to be started by the power of the motor 5 and the engine 1.

In this case, in the HEV driving mode step, the motor speed is increased to be synchronized with the engine speed and then the engine clutch 3 may be controlled to be engaged and the second clutch actuator CLA2 may apply a clutch torque to the second clutch CL2 to make the second clutch speed follow up the engine speed so as to control the starting of the vehicles.

For example, the second clutch actuator CLA2 may engage the second clutch CL2 for transmitting power to the backward stage gear and the controller 7 may apply a signal to the motor 5 to increase a forward rotating speed of the motor 5.

Further, the controller 7 may control the motor speed to be synchronized with the engine speed and then control the engine clutch 3 to be engaged.

Further, the brake may be released by the ESP system like the case in which the brake is operated as described above and the controller 7 may request the brake release signal to the ESP.

Figure 3:
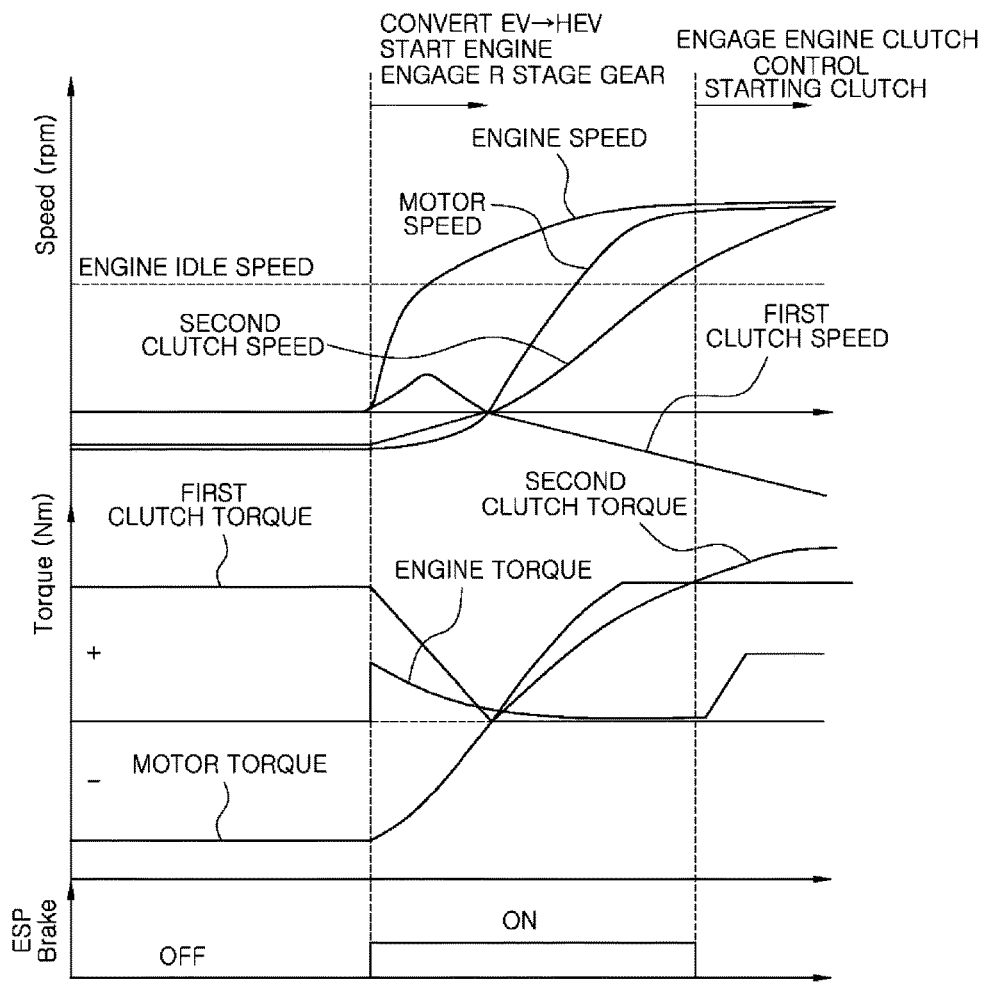
FIG. 3 is a diagram illustrating a change in speed and torque of an engine, a motor, a first clutch, and a second clutch at the time of a driving control according to an exemplary embodiment of the present disclosure.

A control flow of the driving control method for hybrid vehicles according to the exemplary embodiment of the present disclosure will be described with reference to FIGS. 2 and 3.

When the backward driving of the uphill road is required, that is, when the vehicle is backwards moved facing the uphill road, the first stage gear is engaged and the vehicles are driven backward by driving the motor 5 backward (S10).

Since the vehicles may not be driven backward only by the power of the motor 5 while driving like this or the SOC of the battery is low, it is determined whether the conversion into the HEV mode is required (S20).

In the determination step, if it is determined that the conversion of the EV mode into the HEV mode is required, the engine 1 is started and the backward stage gear is engaged (S30).

Along with this, the first clutch CL1 is released to cut off the transmission of power of the motor 5 to the first stage gear and at the same time the motor is converted from the backward driving into the forward driving. In this case, since the vehicles may slip on the uphill road as the second clutch CL2 is also released together with the first clutch CL1, the second clutch CL2 requests the brake operation to the ESP, thereby inhibiting or preventing the vehicles from slipping backward. Further, the second clutch CL2 is engaged to transmit the power of the motor 5 to the backward stage gear (S30).

Next, the motor speed is gradually increased to be synchronized with the engine speed (S40) and then the engine clutch 3 is engaged (S50).

At the same time, the second clutch CL2 is controlled to make the second clutch speed follow up the engine speed while requesting the brake release to the ESP, such that the vehicles are controlled to be started in the HEV mode using the power of the motor 5 and the engine 1 together, thereby driving the vehicles backward (S50).

As described above, it is possible to improve the driving drivability by inhibiting or preventing the slip of the vehicles in the case in which the EV mode is converted into the HEV mode at the time of the backward climbing driving by driving the motor 5 backward in the state in which the first stage gear is engaged.

Further, it is possible to fundamentally inhibit or prevent the engaging/releasing noise of the backward stage gear upon the ignition on/off by performing the backward driving using the first stage gear, improve the lurch driving responsiveness and inhibit or prevent the engaging/releasing noise of the gear since there are no engaging and releasing events of the first stage gear and the backward stage gear upon the R-D and D-R lurch mode, reduce the baulking probability of the backward stage by reducing the frequency of backward stage engagement, and improve the actual fuel efficiency by improving the regenerative braking upon the lurch mode.

According to the exemplary embodiments of the present disclosure, it is possible to improve the driving drivability by inhibiting or preventing the slip of the vehicles in the case in which the EV mode is converted into the HEV mode at the time of the backward climbing driving by driving the motor backward in the state in which the first stage gear is engaged.

Although the present disclosure has been shown and described with respect to specific exemplary embodiments, it will be obvious to those skilled in the art that the present disclosure may be variously modified and altered without departing from the spirit and scope of the present disclosure.

What is claimed is:

1. A driving control method for a hybrid vehicle including an engine, a motor, and an engine clutch disposed between the engine and the motor, comprising:
   a determining step of determining whether the hybrid vehicle is sufficiently driven backward only by power of the motor when the hybrid vehicle is backward driven on an uphill road by the motor which rotates in a backward driving direction while a forward stage gear disposed on a first input shaft is engaged and a first clutch is engaged with the first input shaft so as to receive power from the motor;

a preparing step of preparing a hybrid electric vehicle (HEV) mode in which the engine is started when the power of the motor is insufficient to perform the backward driving of the hybrid vehicle;

a braking step in which the first clutch is released and at the same time a brake operation signal is requested by a controller to the hybrid vehicle while a rotation direction of the motor is converted from the backward driving direction into a forward driving direction; and a HEV driving step including:
 engaging a second clutch with a second input shaft configured to receive power from the motor;
 engaging a backward stage gear disposed on the second input shaft and;
 requesting, by the controller, a brake release signal to the hybrid vehicle while the engine clutch is engaged to control the hybrid vehicle to be started by the power of the motor and the engine.

2. The driving control method for the hybrid vehicle of claim 1, wherein a brake is operated and released by an electronic stability program (ESP) system.

3. The driving control method for the hybrid vehicle of claim 1, wherein in the HEV driving step, a motor speed is increased to be synchronized with an engine speed and then the engine clutch is engaged and the second clutch is controlled to make a second clutch speed follow up the engine speed so as to control the starting of the hybrid vehicle.

4. The driving control method for the hybrid vehicle of claim 1, wherein the forward stage gear and the backward stage gear are engaged and released by an odd stage gear actuator and an even stage gear actuator, respectively, the first clutch and the second clutch are engaged and released by first and second clutch actuators, respectively, the controller configured to control driving of the odd stage gear actuator, the even stage gear actuator, the first and second clutch actuators, the engine, and the motor, the controller configured to determine whether the hybrid vehicle is driven backward only by the power of the motor, and the controller configured to request a brake operation signal and a brake release signal to the hybrid vehicle.

* * * * *